United States Patent [19]

Nitta

[11] Patent Number: 4,814,790

[45] Date of Patent: Mar. 21, 1989

[54] DUAL MODE THERMAL PRINTER

[75] Inventor: Hiroshi Nitta, Atsugi, Japan

[73] Assignee: Ricoh Company, Ltd., Tokyo, Japan

[21] Appl. No.: 160,131

[22] Filed: Feb. 25, 1988

[30] Foreign Application Priority Data

Feb. 25, 1987 [JP] Japan .................................. 62-43496

[51] Int. Cl.⁴ .......................... G01D 15/10; B41J 3/20
[52] U.S. Cl. .................................. 346/76 PH; 400/120
[58] Field of Search ..................... 346/76 PH; 400/120

[56] References Cited

U.S. PATENT DOCUMENTS 4,141,018  2/1979  Mizuguchi et al. ............ 346/76 PH
4,408,212 10/1983  Moriguchi et al. ............ 346/76 PH
4,621,271 11/1986  Brownstein .................... 346/76 PH Primary Examiner—Joseph W. Hartary
Assistant Examiner—Gerald E. Preston
Attorney, Agent, or Firm—Cooper & Dunham

[57] ABSTRACT

A dual mode thermal printer has two modes of operation, i.e., a multi-color recording mode and a monochromatic recording mode. The thermal printer includes a thermal printhead provided with a plurality of resistor elements which are functionally divided into a plurality of blocks, each preferably having the same number of resistor elements. During the multi-color recording mode, the plurality of resistor elements are activated in accordance with image data on a block-by-block basis; whereas, during the monochromatic recording mode, at least two blocks of the plurality of resistor elements are activated at the same time.

8 Claims, 11 Drawing Sheets

DUAL MODE THERMAL PRINTER

BACKGROUND OF THE INVENTION

1. Field of the Invention

This invention generally relates to a thermal printer for carrying out printing thermally by using a thermal printhead and in particular to a dual mode thermal printer having a multi-color recording mode and a monochromatic recording mode.

2. Description of the Prior Art

A thermal printer is well known in the art. Typically, use is made of thermally sensitive paper as a recording medium, which is moved relative to and in contact with a thermal printhead provided with a plurality of heat-producing elements, such as electrical resistors, arranged in the form of a single array as spaced apart from one another at a predetermined pitch. Recently, there has been developed multi-color thermally sensitive paper capable of producing two or more color dots when heated. Such multi-color thermally sensitive paper is typically comprised of a plurality of layers overlying one on top of another, each capable of producing a predetermined color when it is heated to within a predetermined temperature range. In such a multi-color thermal printer, it is important to properly control the temperature of the thermal printhead, in particular each of its resistor elements, so as to obtain a printed image high in quality. However, in order to carry out a proper temperature control operation, the recording speed must be set at a lower level, which is disadvantageous.

SUMMARY OF THE INVENTION

In accordance with the principle of the present invention, there is provided a dual mode thermal printer which comprises a thermal printhead provided with a plurality of heat-producing elements, such as resistor elements, arranged in the form a single array as spaced apart from one another at a predetermined pitch. The thermal printer also includes control means for controlling the operation of the thermal printhead. The thermal printer has two modes of operation, i.e., a multi-color recording mode and a monochromatic recording mode. Typically, use is made of a multi-layered sheet of thermally sensitive paper, which includes a plurality of layers laying one on top of another and each capable of producing a predetermined color when heated to a predetermined temperature range.

In accordance with one feature of the present invention, a line of image data to be printed is divided into a plurality of blocks. And, during the multi-color recording mode, an activation energy based on the image data is supplied to the thermal printhead on a block-by-block basis ; whereas, during the monochromatic recording mode, an activation energy based on the image data is supplied to two or more blocks of the thermal printhead at the same time. And, the activation energy to be supplied to the resistor elements of the thermal printhead is controlled based on the current image data to be printed and also on the past image data, preferably a plurality of preceding lines of image data.

It is therefore a primary object of the present invention to obviate the disadvantages of the prior art as described above and to provide an improved thermal printer.

Another object of the present invention is to provide a dual mode thermal printer having a multi-color recording mode and a monochromatic recording mode, which may be set selectively.

A further object of the present invention is to provide an improved multi-color thermal printer using a sheet of multi-color thermal sensitive paper as a recording medium.

A still further object of the present invention is to provide a dual mode thermal printer fast and reliable in operation, simple in structure, inexpensive to manufacture and capable of producing a printed image of high quality.

Other objects, advantages and novel features of the present invention will become apparent from the following detailed description of the invention when considered in conjunction with the accompanying drawings.

DESCRIPTION OF THE PREFERRED EMBODIMENTS

Figure 1:
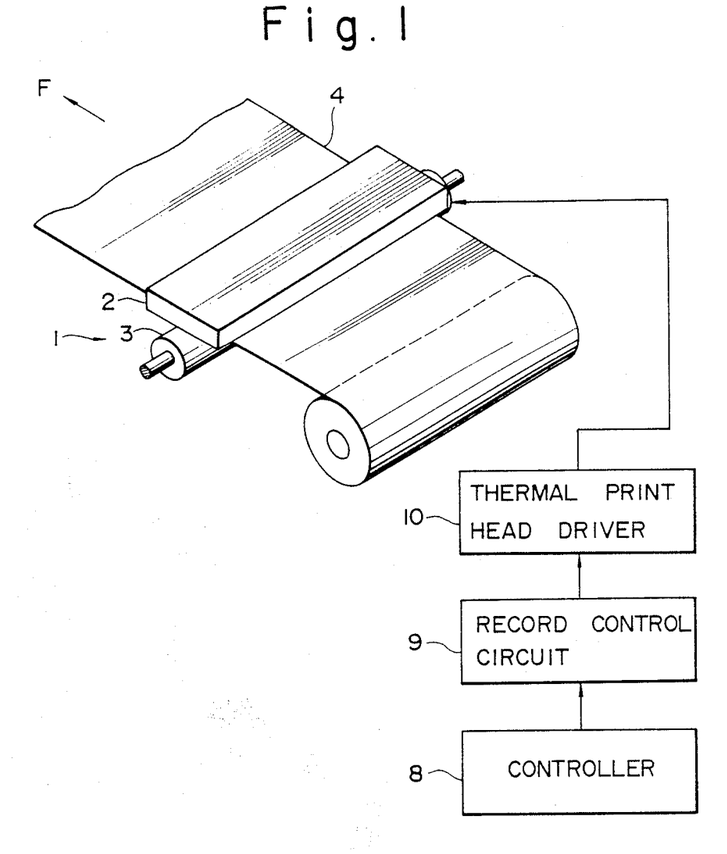
FIG. 1 is a schematic illustration showing in perspective a dual mode thermal printer constructed in accordance with on of the present invention.

Referring now to FIG. 1, there is schematically shown a dual mode thermal printer 1 constructed in accordance with one embodiment of the present invention. As will become clear later, the illustrated thermal printer 1 has two modes of operation, i.e., a multi-color recording mode for recording an image with red and black colors and a monochromatic or black-and-white recording mode, which may be set selectively. The thermal printer 1 includes a thermal printhead 2 as its recording unit and a platen roller 3 which is normally pressed against the thermal printhead 2 by means of an urging means, such as a spring. As well known in the art, the thermal printhead 2 is provided with a plurality of heat-producing elements, such as electrical resistor elements, which are arranged in the form of a single linear array extending in a predetermined direction, which defines an optical or main scanning direction, as spaced apart from one another at a predetermined pitch. It is to be noted that the plurality of heat-producing elements are functionally divided into four blocks, each having the same number of elements. For example, if the thermal printhead 2 includes 2,048 heat-producing elements, each of the blocks contains 512 elements.

Figure 2:
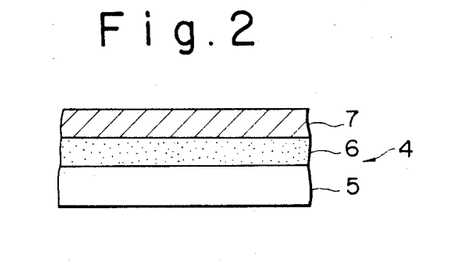
FIG. 2 is a schematic illustration showing in cross section a multi-layered sheet of thermally sensitive paper which may be advantageously used as a recording medium in the dual mode thermal printer shown in FIG. 1.

A sheet of heat sensitive paper 4 unrolled from a roll extends between the thermal printhead 2 and the platen roller 3, and the sheet of heat sensitive paper 4 is driven to move in a direction indicated by the arrow F through the contact with the rotating platen roller 3 while being pressed against the thermal printhead 2. Thus, there is a relative motion between the thermal printhead 2 and the heat sensitive paper 4, and the direction F of this relative motion defines the so-called auxiliary scanning direction. The heat sensitive paper 4 has a structure shown in FIG. 2, and it has a multi-layer structure including a base or support layer 5, a first color producing layer 6 and a second color producing layer 7 overlying one on top of another in the order mentioned. In the illustrated embodiment, the first color producing layer 6 will produce a first predetermined color when heated to a first temperature range and the second color producing layer 7 will produce a second predetermined color when heated to a second temperature range which is lower than the first temperature range in the illustrated embodiment. That is, in the illustrated embodiment, the first predetermined color produced by the first color producing layer 6 is red color and the second predetermined color produced by the second color producing layer 7 is black color. And, the color producing temperature ratio between red and black is set at 3 to 1.

Referring again to FIG. 1, the thermal printhead 2 is operatively coupled to a controller 8 through a record control circuit 9 and a thermal printhead driver 10. Under the control of the controller 8 and the record control circuit 9, thermal energy, typically electric current, is supplied to each of the plurality of resistor elements selectively in the form of activation or thermal pulse. When such a thermal pulse is supplied to a selected one of the plurality of resistor elements, the resistor element becomes heated to apply heat to the heat sensitive paper 4 to thereby form a darkened or burn spot, which defines a pixel in a dot matrix image. The controller 8 is in charge of the overall control of the thermal printer 1 and it receives an image data from an external apparatus, such as a host system, and supplies it to the record control circuit 9. Upon receipt of red and black image data, the record control circuit 9 controls the thermal energy which is necessary for recording an image based on the image data thus received and then outputs corrected image data to the thermal head driver 10. Thus, in accordance with the corrected image data, the thermal printhead driver 10 supplies thermal energy to the resistor elements of the thermal printhead 2 selectively.

Figure 3:
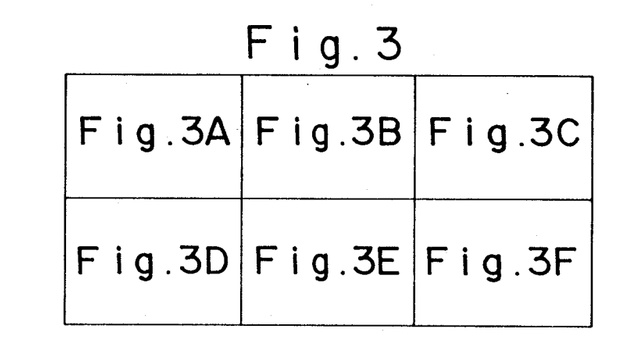
FIG. 3 is an illustration showing how to combine FIGS. 3A through 3F.
Figure 3A:
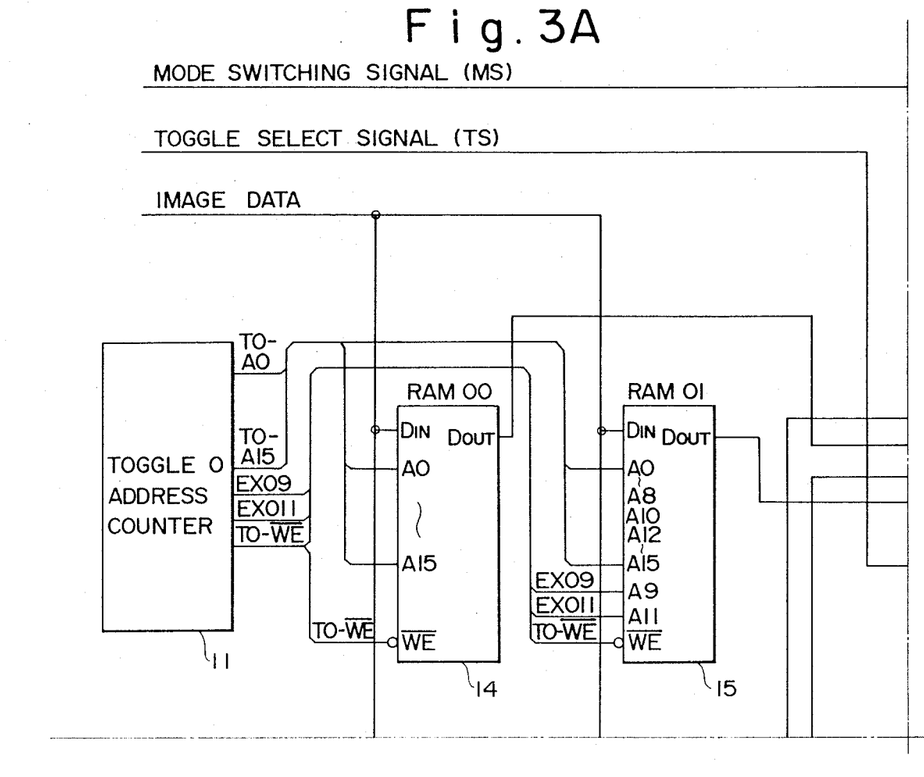
FIGS. 3A through 3F, when combined as shown in FIG. 3, define a block diagram showing the detailed structure of a record-control circuit provided in the thermal printer shown in FIG. 1.
Figure 3B:
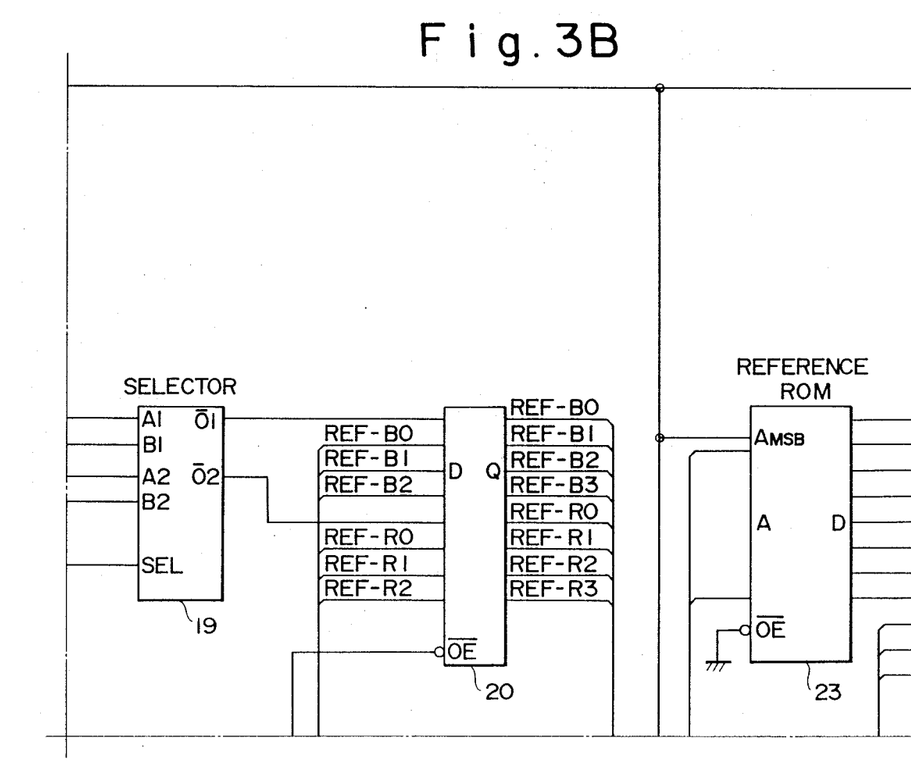
Figure 3C:
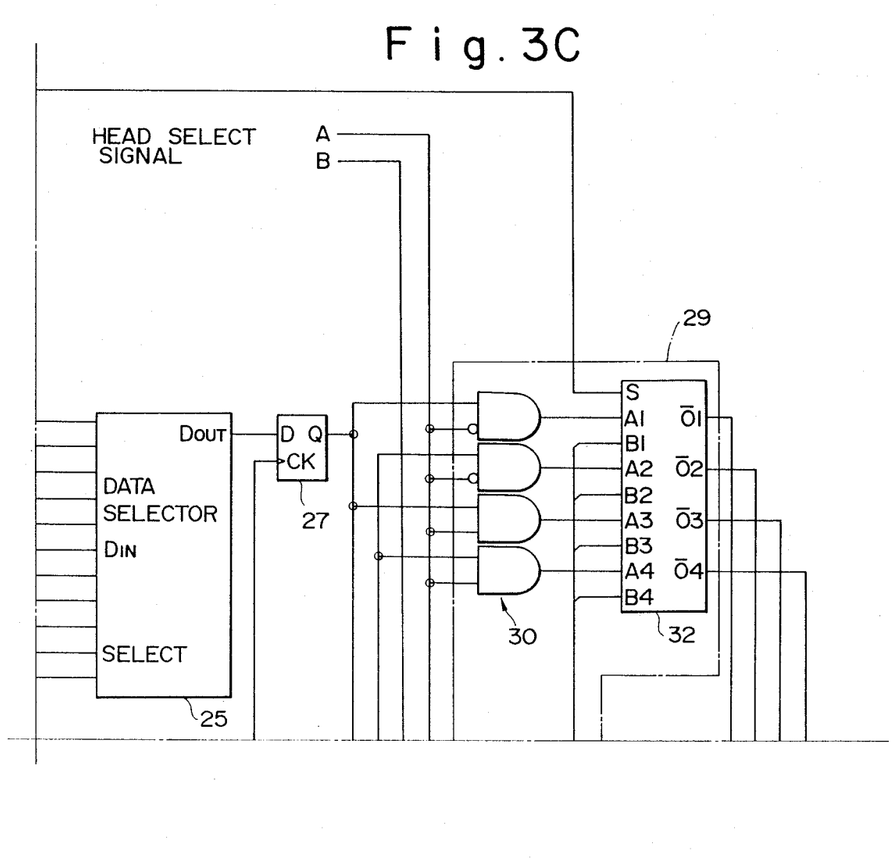
Figure 3D:
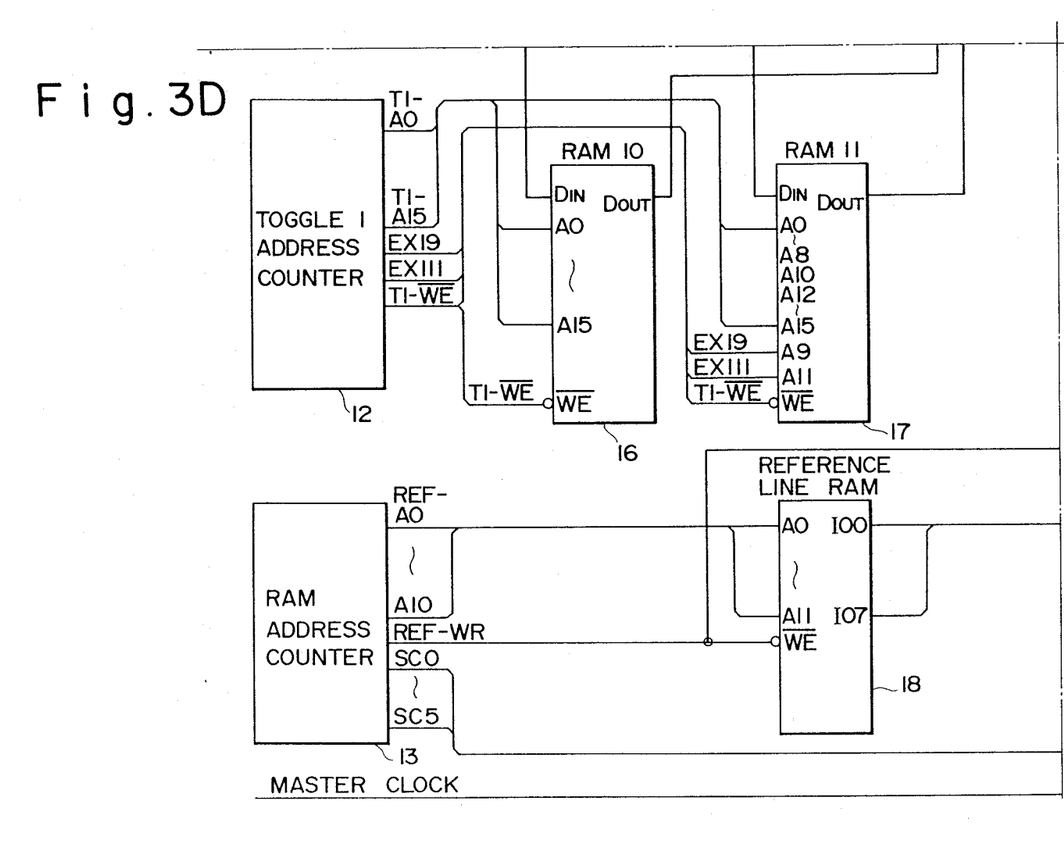
Figure 3E:
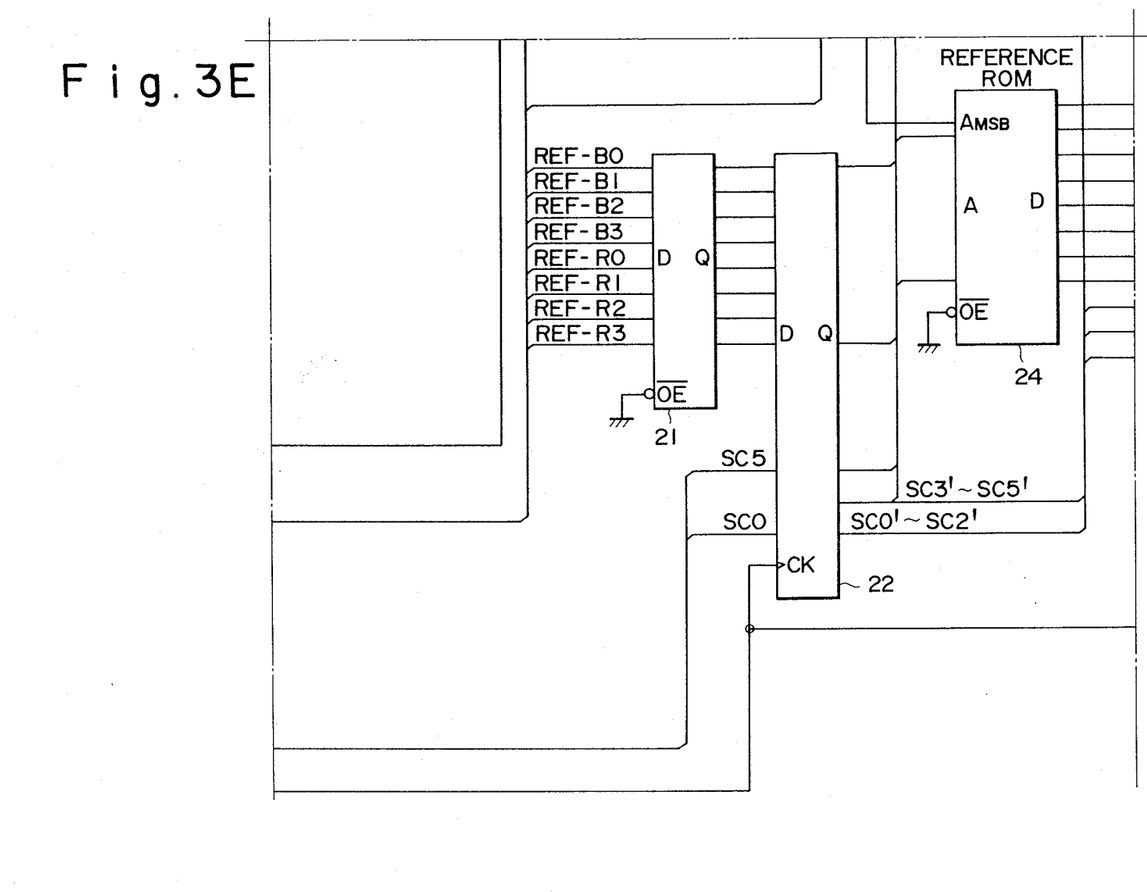
Figure 3F:
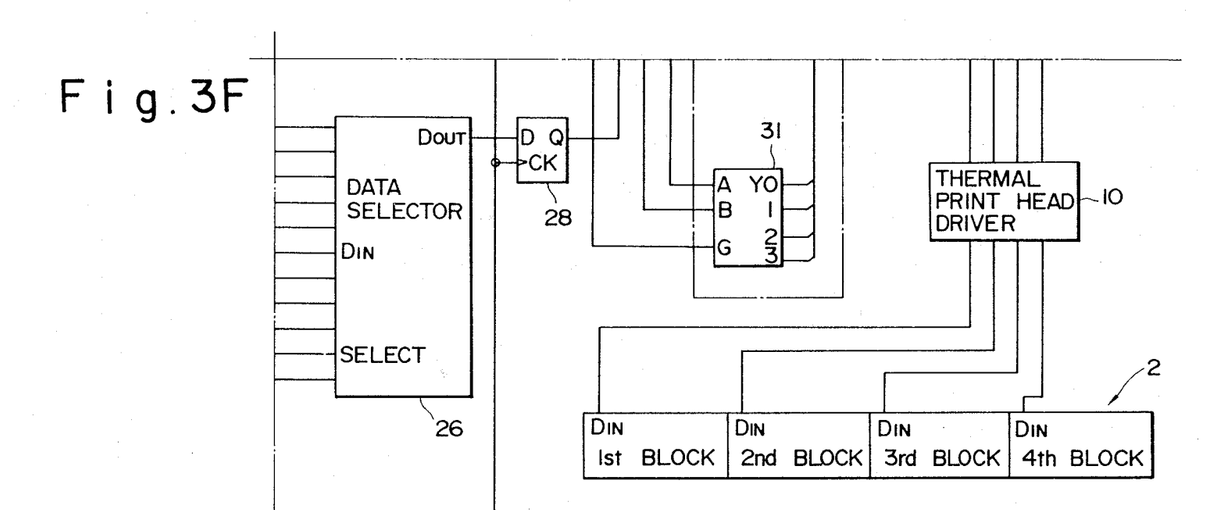

As shown in FIGS. 3A through 3F, which are to be combined as illustrated in FIG. 3, the record control circuit 9 includes a toggle 0 address counter 11, a toggle 1 address counter 12, a RAM address counter 13, a RAM(00) 14, a RAM(01) 15, a RAM(10) 16, a RAM(11) 17, a reference line RAM 18, a selector 19, an IC 20, an IC 21, an IC 22, a reference ROM 23, a reference ROM 24, a data selector 25, a data selector 26, a latch 27, a latch 28 and a block selector 29. A thermal pulse is supplied to each of the four blocks of the resistor elements of the thermal printhead 2 selectively through the thermal printhead driver 10.

The RAMs 14 and 15 store red or black image data line by line and each of them has a capacity to store thirty-two (32) lines of image data. The same image data is stored with the same address in each of these two RAMs 14 and 15, and the address management of these RAMs 14 and 15 is carried out by the toggle 0 address counter 11. The RAMs 16 and 17 are structurally identical to the RAMs 14 and 15, and similarly they store red or black image data line by line up to thirty-two (32) lines. The address management of these RAMs 16 and is carried out by the toggle 1 address counter 12. As will become clear later, a toggle operation is provided between the pair of RAMs 14 and 15 and the pair of RAMs 16 and 17. That is, upon receipt of image data, the pair of RAMs 14 and 15 is first set in a write mode so that the image data thus received is stored into the pair of RAMs 14 and 15. And, when the pair of RAMs 14 and 15 has become full, the other pair of RAMs 16 and 17 is set in a write mode so that the subsequent image data is stored into the pair of RAMs 16 and 17. On the other hand, when the pair of RAMs 16 and 17 has been set in the write mode, the other pair of RAMs 14 and 15 is set in a read mode to thereby establish a condition in which the image data stored in the pair of RAMs 14 and 15 may be read out. In this manner, each of the two pairs of RAMs 14–15 and 16–17 alternates the write and read modes in a staggered relationship, which allows to provide an enhanced processing speed. The image data stored in these RAMs 14–15 and 16–17 are read out serially and supplied to the IC 20 through the selector 19.

The reference line RAM 18 is a memory to store the preceding image data, e.g., last three lines of image data in the illustrated embodiment, as reference data. During a red/black multi-color recording mode, the reference line RAM.18 stores the last three lines of red and black data; on the other hand, during a monochromatic recording mode, the reference line RAM 18 stores the last three lines of black data in pairs. The address management of the reference line RAM 18 is carried out by the RAM address counter 13. It is to be noted that hereinafter the preceding data stored in the reference line RAM 18 will be also referred to as "reference data." In accordance with a designated address, the reference data is read out of the reference line RAM 18 and supplied to the IC 20.

In accordance with a toggle select signal TS supplied from the controller 8, the selector 19 selects the image data stored in any of the RAMs 14 and 15 and RAMs 16 and 17 and outputs it to the IC 20. Then, the IC 20 selects the output data in accordance with a REF-WR signal from the RAM address counter 13 and outputs the selected output data to the IC 21 and also to the reference line RAM 18. In other words, the REF-WR signal is a signal which designates the writing operation of the reference line RAM 18, and while the REF-WR signal designates a writing operation, the IC 20 transfers the image data supplied from the RAMs 14 and 15 of RAMs 16 and 17 through the selector 19 to the reference line RAM 18 to thereby carry out rewriting of image data. On the other hand, if the REF-WR signal does not designate a writing operation, both of the image data supplied through the selector 19 and the reference data supplied from the reference line RAM 18 are output to the IC 22 through the IC 21. The rewriting of image data at the reference line RAM 18 is carried out such that the oldest reference data is discarded and the most up-to-date image data is stored.

At the IC 22, the image data (serial) supplied from the IC 21 and strobe data SC supplied from the RAM address counter 13 are combined to define address data which are supplied to the reference ROM 23 and also to the reference ROM 24. In addition, the IC 22 supplies the strobe data SC to the data selectors 25 and 26. The strobe data SC indicates the number of reading operations for reading the image data from the RMAs 14 and 15 or 16 and 17 (i.e., as will be described later, the number of times to supply a heat pulse to the heater elements of the thermal printhead 2 selectively) and it is counted by the RAM address counter 13. In the reference ROMs 23 and 24, corrected image data is stored in advance with the current image data, reference data and strobe data as parameters, and the corrected image data has been so set to control the temperature of a resistor element, to which the current image data is to be supplied, to a level optimal to the current image data in consideration of the previous recording history (i.e., reference data) and the number of strobes (i.e., strobe data). Thus, the correction image data is stored in the reference ROMs 23 and 24 in the form of data using the current image data, reference data and strobe data as address information.

The reference ROM 23 is a memory for multi-color recording and also for monochromatic recording. Thus, for multi-color recording, correction image data corresponding to the color of the current image data is stored using the red and black data of the current image data and reference data and the strobe data as address data. In addition, for monochromatic recording, correction image data corresponding to the black and white of the current image data is stored using the black data of the current image data and reference data and the strobe data as address data. The reference ROM 24 is a memory dedicated for monochromatic recording and the correction image data for monochromatic recording similar to that of the reference ROM 23 is stored therein. A mode switching signal MS is supplied to each of the reference ROMs 23 and 24 to thereby carry out the switching of modes of operation of the reference ROM 23 and switching of active/non-active states of the reference ROM 24. The correction image data output from the reference ROMs 23 and 24 is converted into a serial image data by the data selectors 25 and 26, respectively, and the thus converted serial image data is input into the block selector 29.

The block selector 29 includes a plurality of AND gates 30, a selector 31 and a selector 32 and it receives such input signals as a head select signal A, a head select signal B and a mode switching signal MS. In accordance with these input signals, i.e., head select signals A and B and mode switching signal MS, the block selector 29 supplies the correction image data from the latches 27 and 28 to the thermal printhead driver 10. Then, based on the correction image data thus supplied, the thermal printhead driver 10 supplies heat pulses to the thermal printhead 2. It is to be noted that, although not shown, various signals, such as mode switching signal MS and strobe signals, which are necessary for controlling the overall operation of the thermal printer 1 are supplied to each of the toggle 0 address counter 1, toggle 1 address counter 12 and RAM address counter 13 from the controller 8.

The operation of the present thermal printer 1 will now be described. As described above, the present thermal printer 1 has two modes of operation, i.e., multi-color and monochromatic recording modes, and the manner of operation differs between these two modes of operation. Thus, the operation of the present thermal printer 1 will be described mode by mode.

I. MULTI-COLOR RECORDING MODE

When the multi-color recording mode has been selected, the mode switching signal MS takes a status to indicate the multi-color recording mode so that the toggle 0 address counter 11, toggle 1 address counter 12 and block selector 29 are all set in the multi-color recording mode. In the first place, the RAM(00) 14 and RAM(01) 15 are set in the write mode so that the current image data is input into these RAMs 14 and 15. The image data is comprised of black and red data and thus one line of image data is comprised of one line of black data and another line of red data. The relationship between the black and red data is shown in Table 1 below and one dot or pixel of information is defined by two bits of data.

TABLE 1

| | WHITE | BLACK RECORDING | RED RECORDING |
|---|---|---|---|
| BLACK DATA | 0 | 1 | 1 |
| RED DATA | 0 | 0 | 1 |

As described previously, in the illustrated embodiment, the thermal energy required for recording red and black dots is set at 3 to 1. Thus, supposing that the current red line data is $(n)_R$ and the black line data $(n)_B$, the weighting for the past history is, for example, set as $(n-1)_R$ being larger than $(n-2)_R$ which in turn is larger than $(n-1)_B$.

Figure 4:
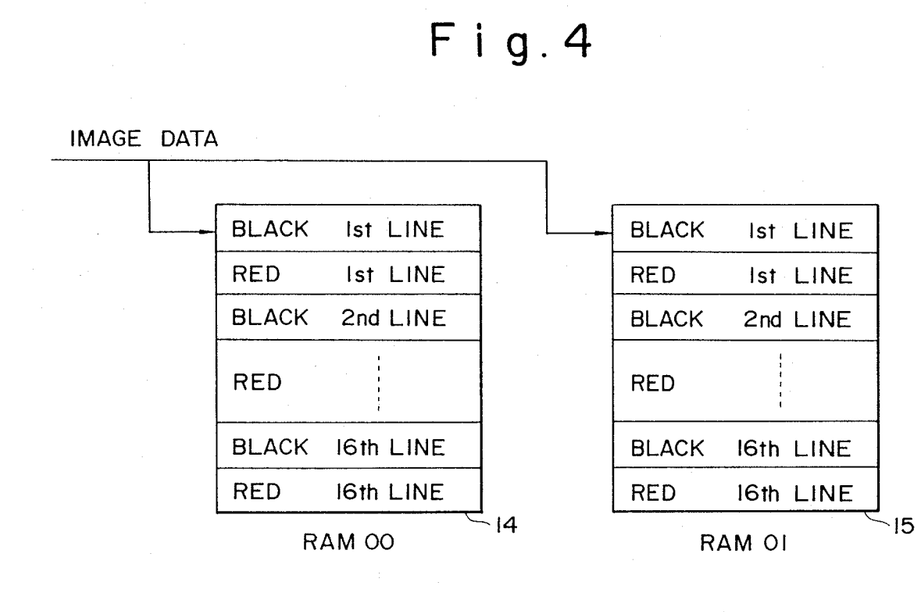
FIG. 4 is an illustration showing how the current image data is stored in a RAM of the thermal printer of FIG. 1 during a multi-color recording mode.

As illustrated in FIG. 4, the image data is stored into the RAM(00) 14 and also into the RAM(01) 15 in the order of first line of black data, first line of red data, second line of black data, second line of red data, ..., and 16th line of red data. When the image data has been input into each of the RAM(00) 14 and RAM(01) 15 up to sixteenth lines of black and red data and thus both of RAMs 14 and 15 have become full, the RAMs 14 and 15 are switched to the read mode while the other pair of RAMs 16 and 17 is set in the write mode. Thus, the image data is now stored into the RAMs 16 and 17 in the order of 17th line of black data, 17th line of red data, ..., and 32nd line of red data. In parallel with the writing operation into the pair of RAMs 16 and 17, the image data stored in the RAMs 14 and 15 are read out to be used for controlling the supply of heat pulses to the thermal printhead 2.

The reading out of the image data from the RAMs 14 and 15 is carried out in synchronism with a master clock such that the first block of black data (0–512 dots) of the first line is read out of the RAM(00) 14 and on the other hand from the RAM(01) 15 is read out the first block of red data (0–512 dots) of the first line while shifting one line (2,048 dots). The black and red data for one block read out of the RAMs 14 and 15 is then supplied to the IC 20 through the selector 19; on the other hand, the first block of reference data, comprised of black and red data, for the last preceding three lines is supplied from the reference line RAM 18 to the IC 20. The reference data contains the data of the last three lines; on the other hand, the image data just read out of the RAMs 14 and 15 constitutes a current line of image data to be printed and thus do not contain the preceding image data which has already been used for recording. In the present case, it is set as a data indicating white. These reference data and current image data read out of the RAMs 14 and 15 are combined at the IC 20 on a pixel-by-pixel basis and also on a black data-by-black data basis, so that there is formed a 4-bit data for each of black and red data of a pixel, which in turn is supplied to the IC 22 through the IC 21.

At the IC 22, these 4-bit data are combined with the strobe data SC supplied from the RAM address counter 13 to thereby produce address data which is then supplied to each of the reference ROMs 23 and 24. Under the current condition, since the mode switching signal MS indicates the multi-color recording mode, only the reference ROM 23 is rendered active. Thus, in response to the address data which has been input, the reference ROM 23 reads out the previously stored correction image data and supplies it to the latch 27, which in turn supplies the correction image data to the block selector 29 in synchronism with the master clock. Since the first block of the thermal printhead 2 has been currently selected by the mode switching signal MS and the head select signals A and B, the block selector 29 causes the correction image data from the data selector 26 to be supplied to the thermal printhead driver 10 as the correction image data corresponding to the first block of the thermal printhead 2. Accordingly, in accordance with the correction image data thus supplied, the thermal printhead driver 10 supplies heat pulse to the resistor elements of the first block of the thermal printhead 2 selectively.

The sequence of steps from the reading out of image data from the RAMs 14 and 15 to the supply of heat pulses is repetitively carried out over a predetermined number of times, e.g., thirty-one (31) times, and the recording operation for the first block is completed. Upon completion of recording for the first block, the black and red data for the first block is once again read out of the RAMs 14 and 15 and then, while switching the REF-WR signal from the RAM address counter 13 to a write designation status, transferred to the reference line RAM 18 to carry out rewriting of the data stored in the RAM 18. Thereafter, the address is incremented by the amount of 512 dots and then the black and red data for the second block (513–1,024 dots) is read out of the RAMs 14 and 15, followed by the similar repetitive operation over a number of times determined by the strobe signal. Such an operation is repeated up to the fourth block to complete the recording operation for one line. Upon completion of recording for one line, the address is incremented by the amount of 2,048 dots (one line), and then the black data for the second line is read out of the RAM(00) 14 while reading the red data out for the second line out of the RAM(01) 15. And, when this series of steps has been completed up to the sixteenth line, the RAMs 14 and 15 are switched into the write mode to thereby store new image data. At the same time, the RAMs 16 and 17 are switched to the read mode, so that the above-described recording operation proceeds from the seventeenth line of image data. In this manner, in the present embodiment, the pair of RAMs 14 and 15 and the other pair of RAMs 16 and 17 are toggled so that there is no wait time for writing image data into a memory and thus there is provided a high speed recording operation.

Figure 5:
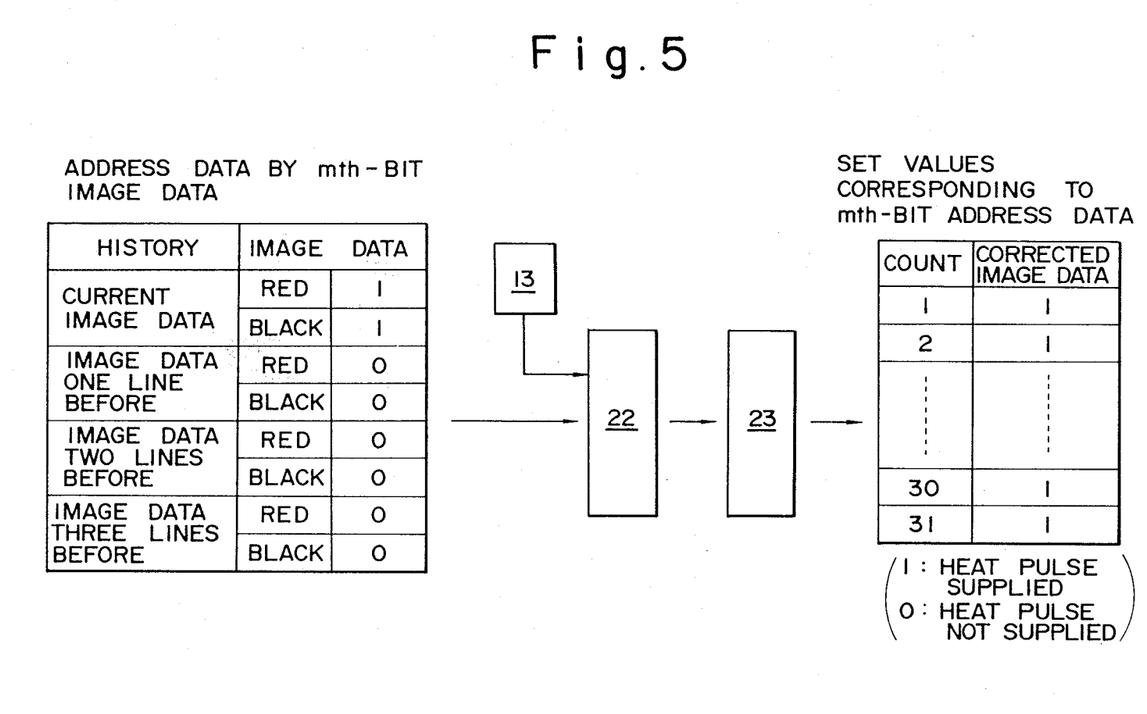
FIGS. 5 and 6 are illustrations which are useful for explaining the relationship between the reference data and the corrected image data in the thermal printer of FIG. 1.
Figure 6:
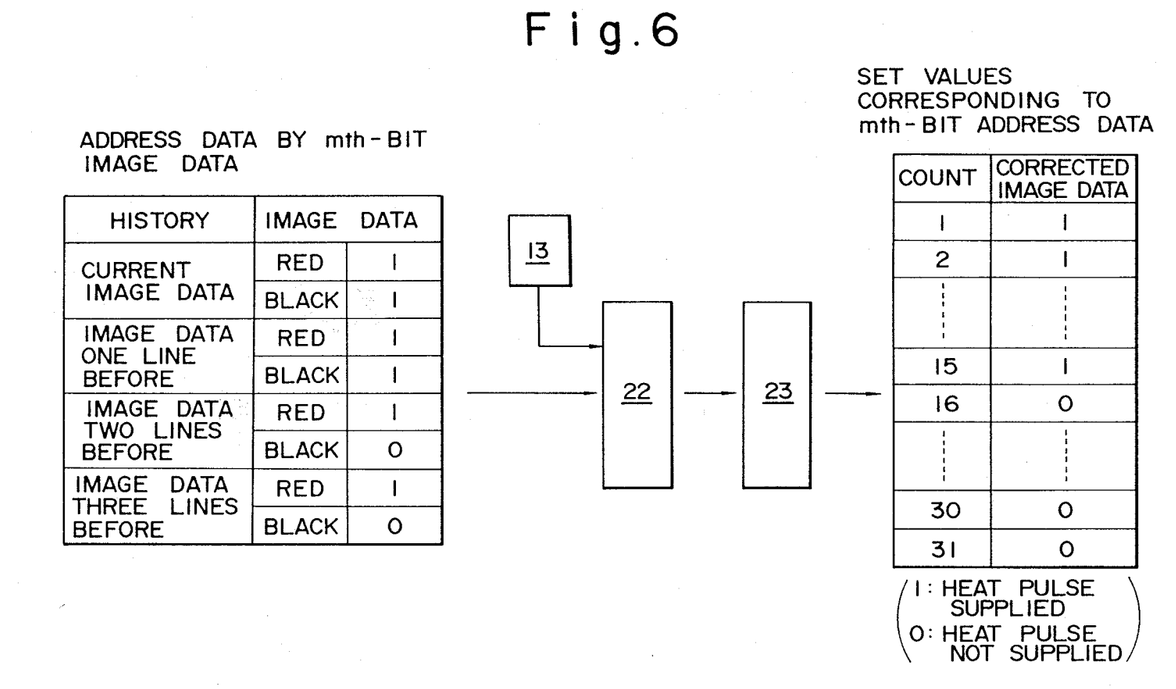

FIGS. 5 and 6 illustrate one example of providing corrected image data in the reference ROM 23. FIG. 5 illustrates the case in which the mth bit or dot of the current line is to be recorded in red color and the corresponding mth dots in the last three preceding lines were all recorded as white dots. In this case, it is expected that the resistor element corresponding to the mth dot is relatively lower in temperature since it has not been activated at least for the last three lines, and thus data "1" is set for each count as the corrected image data for the mth dot so as to allow to supply enough energy to the corresponding resistor element. Under this condition, if the activation time period per pulse (pulse width) is 100 micro-seconds, since the heat pulse is applied over 31 times in the example shown in FIG. 5, the mth dot of this line receives thirty-one heat pulses, which corresponds to the total activation time period of 3.1 milli-seconds.

On the other hand, FIG. 6 illustrates the case in which the mth bit or dot of the current line is also to be recorded in red color. In this case, however, the history of recording of the mth bit for the last three lines indicates the fact that it was recorded in red color in the line which is one line before and in black in the lines which are two and three lines before. As a result, in the present example, since recording was carried out for the last three lines, it is considered that the resistor element corresponding to the mth dot is relatively high in temperature. Thus, as shown in FIG. 16, as the corrected image data for the mth dot, "1" is set for the counts from "1" to "15" and "0" is set for the counts from "16" to "31." Therefore, in this case, a heat pulse is supplied to the corresponding heater element only fifteen times. If the heat pulse has a pulse width of 100 micro-seconds, the total activation time period for keeping the corresponding resistor element activated results in 1.5 milli-seconds.

Although only the case of recording a red dot has been described, it should be noted that the recording of a black dot is carried out similarly by determining the number of times to supply a heat pulse based on the corrected image data output from the ROM 23. It should also be noted that, in accordance with the present embodiment, the activation energy to be supplied to each of the heater elements can be determined optimally based on the information regarding the past activation condition. In addition, in setting the corrected image data, not only the past activation history of black and red data, but also the weighting between the black and red data has been taken into consideration, so that the activation energy can be set most optimally bit by bit in accordance with the present embodiment. As a result, even if the recording speed is set at a high level, the temperature control of each of the resistor elements can be carried out optimally and properly so as to allow to obtain a printed image of high quality at all times. Thus, in accordance with the present embodiment, in the multi-color recording mode, even if red dots appeared successively in the several previous lines and thus the corresponding resistor element continued to be heated to a high temperature, a white dot printed in the current line is well prevented from becoming somewhat blackened and a black dot printed in the current line would not become redish. Thus, in accordance with the present invention, each color can be produced clearly under any circumstances.

II. MONOCHROMATIC RECORDING MODE

When the monochromatic or black-and-white recording mode has been selected, the mode switching signal MS is switched to indicate the fact that the monochromatic recording mode has been selected. As a result, the toggle 0 address counter 11, toggle 1 address counter 12 and block selector 29 are all set in the monochromatic recording mode. In the monochromatic recording mode, the present thermal printer 1 is so structured that the first and third blocks of the thermal printhead 2 are operated at the same time and the second and fourth blocks are operated at the same time. Thus, the toggle operation between the RAMs 14–15 and the RAMs 16–17 remains the same as that of the multi-color recording mode; however, the method of writing in and reading out image data, i.e., the manner of designating addresses, differs from that of the multi-color recording mode.

Figure 7:
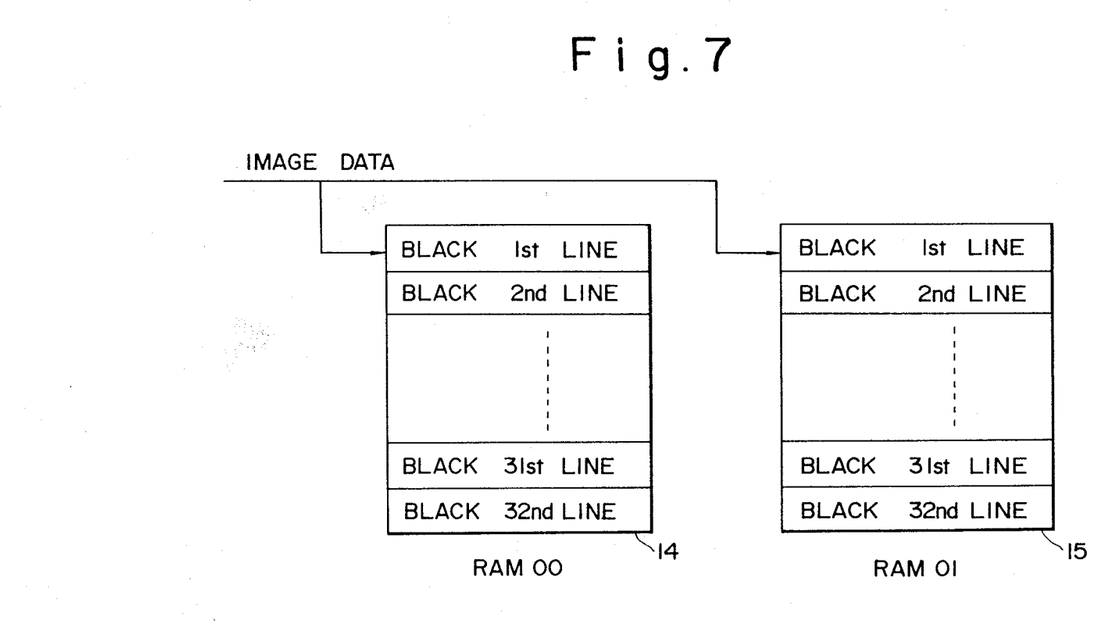
FIG. 7 is an illustration showing how the current image data is stored in a RAM of the thermal printer of FIG. 1 during a monochromatic recording mode.

That is, in the monochromatic recording mode, the image data is comprised only of black data which indicates to record a black dot if it is "1" and a white dot if it is "0." As shown in FIG. 7, the same black data is stored into both of the RAMs 14 and 15 up to thirty-two (32) lines. When thirty-two lines of black data have been stored into both of the RAMs 14 and 15, the next thirty-two lines, i.e., line 33 to line 64, of black data are stored into both of the RAMs 16 and 17. Reading out of the image data is first effected for the RAMs 14 and 15 and the order of reading out of image data is effected while designating the addresses in the manner which will be described below. In the first place, the black data (0–512 dots) of the first block of the first line in the RAM(00) 14 and the black data (1,024–1,535 dots) of the third block of the first line in the RAM(01) 15 are read out at the same time, and they are supplied to the IC 22 together with the reference data which are also comprised of the data of the last three preceding lines similarly with the case of the multi-color recording mode. However, in the case of the multi-color recording mode, both of black and red data of the corresponding block are read out of the reference line RAM 18; on the other hand, in the case of the monochromatic recording mode, since there are only black data and two blocks are operated at the same time, the black data for the last three preceding lines of the two blocks to be operated at the same time are read out.

In the present embodiment, the black data for the last three lines for the first and third blocks are read out and supplied to the IC 22 as reference data. At the IC 22, these black data are combined with the strobe data SC to thereby define address data which in turn are supplied to the reference ROM 23 and also to the reference ROM 24. Under this condition, since the mode switching signal MS indicates the monochromatic recording mode, the reference ROM 23 outputs the corrected image data based on the corresponding portion of the address data for the first block (i.e., the upper half of the address data); whereas, the reference ROM 24 outputs the corrected image data based on the corresponding portion of the address data for the third block (i.e., the lower half of the address data). Only that portion of the corrected image data stored in the reference ROM 23 which relates to the black data is previously stored in the reference ROM 24. The corrected image data read out of the reference ROMs 23 and 24 are converted into serial data by the data selectors 25 and 26, respectively, and the thus converted serial data are latched into the respective latches 27 and 28. Then, after selecting the blocks by the block selector 29, the data is transferred to the thermal printhead driver 10.

At the thermal printhead driver 10, the corrected image data are converted into heat pulses which are then supplied to the first and third blocks of the thermal printhead 2 in parallel and thus at the same time to thereby effect monochromatic recording. The supply of heat pulses is repetitively carried out over the number of times determined by the strobe signal (nine times in the illustrated embodiment), and, thereafter, the black data for the first and third blocks are once again read out of the RAMs 14 and 15 and supplied to the reference line RAM 18 to thereby discard the oldest data for the first and third blocks stored therein. Then, a similar operation is carried out for the second and fourth blocks. That is, by incrementing the address by 512 dots, the black data (513–1,023 dots) for the second block of the first line are read out of the RAM(00) 14 and, on the other hand, similarly by incrementing the address by 512 dots, the black data (1,536–2,048 dots) for the fourth block of the first line are read out of the RAM(01) 15. In this case also, these black data thus read out are combined with the reference data to thereby read out the corresponding corrected image data from the reference ROMs 23 and 24, and then monochromatic recording is effected for the second and fourth blocks of the first line. This sequence of steps is carried out repetitively over a number of times determined by the strobe signal (nine times in the illustrated embodiment). Thereafter, the black data for the second and fourth blocks of the first line are once again read out of the RAMs 14 and 15 and supplied to the reference line RAM 18, whereby the oldest black data for the second and fourth blocks are discarded. Then, the address for the RAMs 14 and 15 is incremented by 1,024 dots and a similar operation is carried out for the second line. In this manner, a similar operation is carried out for thirty-two (32) lines. Upon completion of processing for the thirty-two lines, the RAMs 14 and 15 are set in the write mode and the RAMs 16 and 17 are set in the read mode similarly with the case of the multi-color recording mode.

In the monochromatic recording mode, one line is divided into four blocks which are operated two at a time. The reason for operating two blocks at a time in the monochromatic recording mode is as follows. In a monochromatic recording mode, the recording speed of 2.5 ms/l is typically required. However, for the production of black color with the illustrated heat sensitive paper 4, the energy of 0.36 mJ is required as the color producing energy and the power is generally 0.3 W/dot. Thus, if there has not been black recording for the previous lines and thus the corresponding resistor element is relatively low at temperature, 1.2 milliseconds (=0.36/0.3) is required as an activation time period. Thus, in order to attain the recording speed of 2.5 ms/l, the activation time period of 1.2 milli-seconds cannot be applied to each of the four blocks and the recording must be carried out in two steps, i.e., two blocks at a time (2.5/2≈1.2).

Even in the case of carrying out monochromatic recording in two steps (two blocks at a time), if a half of the data for one line, i.e., 1,024 bits, is supplied serially, it takes 256 micro-seconds using a shift clock of 4 MHz. If it takes 256 micro-seconds for supplying the data of a half line, the data may be supplied only 4.9 times for the recording time period of 1.25 milli-seconds, i.e., half of 2.5 ms/l, (1.2 milli-seconds/256 micro-seconds≈4.9 times). In this case, the energy may be varied only in four levels, which cannot be used for controlling the correction in view of the past activation history.

On the other hand, in accordance with the present embodiment, since the reference ROM 24 for only black data is provided, the supply of data can be carried out for two blocks in parallel and thus the time required for supplying of data is 128 micro-seconds (256/2=128). As a result, for the recording time period of 1.25 milliseconds, the data may be supplied approximately 9.8 times (1.25/128≅9.8) at maximum. In this case, the level of activation energy supplied to a resistor element may be varied in nine steps, which is sufficient in controlling the correction in view of the past activation history in the monochromatic recording operation. As described above, also in the present embodiment, "9" is set as the number of strobes. Accordingly, also in the monochromatic recording mode, the correction of an activation time period in view of the past activation history can be carried out properly without causing a reduction in the recording speed.

In the above-described embodiment, use has been made of the heat sensitive paper 4 capable of producing black and red colors. However, the present invention should not be limited to the use of such specific heat sensitive paper. Use may also be made of heat sensitive paper capable of producing other combinations of two colors or capable of producing three or more different colors.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A dual mode thermal printer having a multi-color recording mode and a monochromatic recording mode, comprising:

a thermal printhead provided with a plurality of heat-producing elements arranged in the form of an array for recording an image on a recording paper, said plurality of heat-producing elements being functionally divided into a plurality of blocks; and controlling means for controlling the operation of said plurality of heat producing elements, said controlling means activating said plurality of heat-producing elements selectively in accordance with image data to be recorded on a block-by-block basis during said multi-color recording mode and at leas two blocks at a time during said monochromatic recording mode.

2. The printer of claim 1, wherein each of said plurality of blocks has the same number of heat-producing elements.

3. The printer of claim 2, wherein each of said heat-producing elements includes an electrically resistive element which produces heat when current is passed therethrough.

4. The printer of claim 1, wherein said controlling means includes setting means for setting an activation energy level to be applied to each of said plurality of heat-producing elements in view of the image data of at least one preceding line.

5. The printer of claim 1, wherein said recording paper is capable of producing at least two predetermined colors depending on the level of heat applied by each of said plurality of heat-producing elements.

6. The printer of claim 5, wherein said recording paper includes a first color producing layer for producing a first predetermined color when heated to a first predetermined temperature range and a second color producing layer overlying said first color producing layer for producing a second predetermined color when heated to a second predetermined temperature range which is different from said first temperature range.

7. The printer of claim 1 further comprising urging means for normally urging said recording paper pressed against said thermal printhead.

8. The printer of claim 7, wherein said urging means includes a platen roller.

* * * * *